July 9, 1940. F. K. HAVEN 2,207,434
PNEUMATIC DISPATCH SYSTEM
Filed Aug. 6, 1936 2 Sheets-Sheet 1
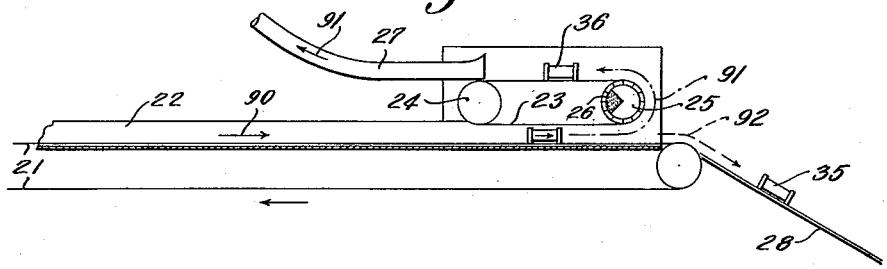
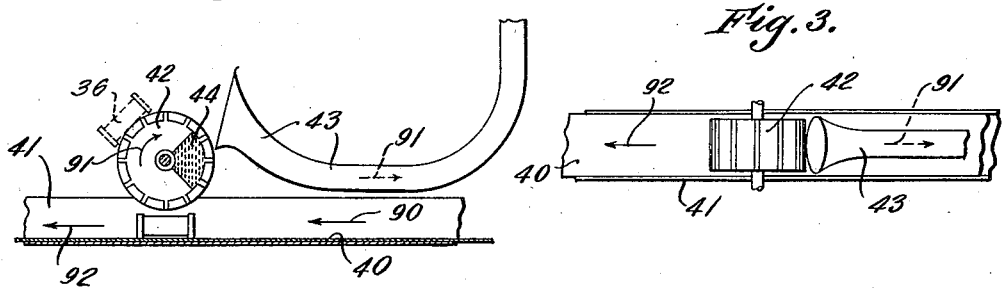
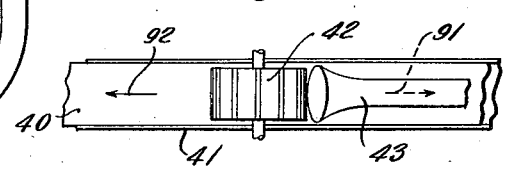
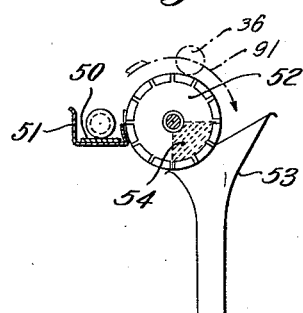
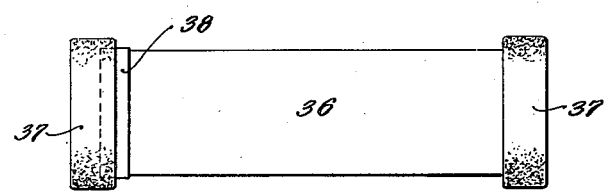
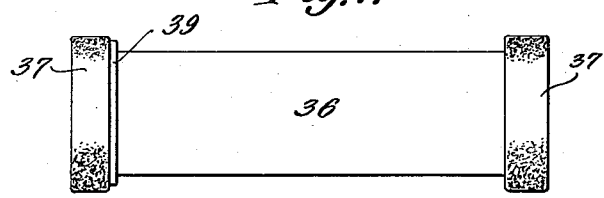
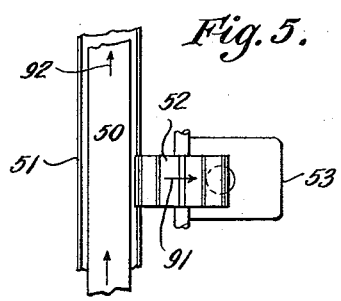
Inventor,
Franklin K. Haven,
by Roberts, Cushman & Woodberry,
Attys.

July 9, 1940.   F. K. HAVEN   2,207,434
PNEUMATIC DISPATCH SYSTEM
Filed Aug. 6, 1936   2 Sheets-Sheet 2

Inventor,
Franklin K. Haven,
by Roberts, Cushman & Woodberry,
Attys.

Patented July 9, 1940

2,207,434

UNITED STATES PATENT OFFICE 2,207,434

PNEUMATIC DISPATCH SYSTEM

Franklin K. Haven, Reading, Mass., assignor to The Lamson Company, Syracuse, N. Y., a corporation of Massachusetts Application August 6, 1936, Serial No. 94,537

20 Claims. (Cl. 243—16)

This invention relates to an improvement in a pneumatic dispatch system and more particularly in means for determining the path of travel of certain carriers in a system.

In pneumatic dispatch systems conditions often require the removal of carriers having a certain type of contents from a line of carriers and the delivery of the removed carriers to a destination other than that to which the other carriers are delivered. Thus in a system for a department store, the system includes carriers for cash and carriers for charge slips. The cash carriers being handled by cashiers and the charge carriers being handled by authorizers it is desirable to separate the carriers automatically so that each will be delivered to the proper destination.

The primary object of this invention is to provide magnetic means by which carriers of a certain type are separated from a heterogeneous line of carriers and directed to a predetermined destination.

A further object of this invention is to employ a magnetic pulley for a carrier engaging belt which will act upon carriers of a certain type and carry them around the pulley with the belt while other carriers will continue their travel undisturbed.

These and other objects will appear from a consideration of the following description of installations embodying this invention and of the accompanying drawings in which Fig. 1 is a schematic view illustrating one embodiment of such installation;

Fig. 2 is a similar view of another embodiment thereof;

Fig. 3 is a plan view of the embodiment shown in Fig. 2;

Fig. 4 is a view similar to Figs. 1 and 2 illustrating another embodiment of the invention;

Fig. 5 is a plan view of the embodiment shown in Fig. 4;

Figure 8:
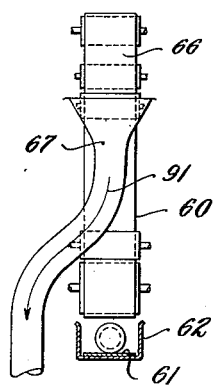

Figs. 6 and 7 illustrate forms of carriers which might be used in connection with this invention; and Figs. 8 and 9, Figs. 10 and 11 and Figs. 12, 13 and 14, respectively, illustrate other embodiments of this invention.

This invention is shown in the drawings and will be described as employed in the handling of cash and charge carriers in a store or office. It will be understood, however, that the invention is not limited to that use and that it is applicable for other uses not only in handling carriers but in handling various other articles responsive to the pull of a magnetic field.

In the embodiment shown in Fig. 1 the carriers on their way to the carrier station are advanced by the endless belt 21, preferably traveling within a channel 22. As the carriers move through the channel 22 they pass under a belt 23 which moves around pulley 24 and 25, the latter being a pulley of the magnetic type.

The carriers are divided into two groups, one group consisting of magnetic carriers, i. e., those made in whole or in part of steel or other metal responsive to a magnetic field, and the other group consisting of non-magnetic carriers, i. e., those made of brass, fibre or other material not responsive to a magnetic field. For convenience in description the magnetic carriers forming the first group will be hereinafter considered to be charge carriers and those of the second group will hereinafter be considered to be cash carriers.

The magnetic pulley 25 may be of any well known suitable construction including a commutator or collector rings (not shown) by which the magnetic power of the pulley surface is controlled. As suggested by the darkened segment 26 the surface of the pulley after it leaves the belt 23 is non-magnetic.

The charge and cash carriers are advanced by the belt 21 below the belt 23. The charge carriers being magnetic are drawn by the action of the pulley 25 away from the belt 21 and caused to travel in contact with the belt 23 around that pulley and when the magnetic attraction is terminated will travel along with the belt 23 to the tube 27 through which they are drawn pneumatically and conducted by suitable means to the authorizers station (not shown). The cash carriers being non-magnetic pass undisturbed below the pulley 25 to the chute 28 and thence to the cashiers station (not shown).

The carriers will be designated in the various embodiments by the numerals 35 and 36, respectively. The carriers 35 are the non-magnetic cash carriers while the carriers 36 are the magnetic charge carriers. The charge carrier may have a body of steel or other magnetic material or a tubular body and heads 37 at each end, said body and heads being of non-magnetic material, and include at one end, preferably the head end, a steel cap 38 (Fig. 6) or a steel disk 39 (Fig. 7), the cap or disk being between the head and that end of the body.

The embodiment shown in Figs. 2 and 3 comprises a belt 40 by which a line of carriers is advanced along a channel 41, a magnetic pulley or wheel 42 below which the carriers pass and a tube 43. The charge carriers 36 being magnetic are removed from the line by the pulley 42 and delivered to the mouth of the tube 43 through which the carriers are advanced pneumatically to the authorizers. The cash carriers continue their travel below the pulley 42 to the cashiers. The shaded sector 44 indicates the portion of pulley surface rendered non-magnetic so that the carriers are released and enter the mouth of the tube 43.

In Figs. 4 and 5 is shown another embodiment of the invention comprising a belt 50, by which the carriers are advanced along a channel 51, a magnetic pulley or wheel 52 by which the charge carriers are removed from the line on the belt 50, and discharged into a chute 53 through which they pass on their way to the authorizers. The magnetic attraction of the pulley surface is cut off as it passes through the shaded sector 54.

Figure 9:
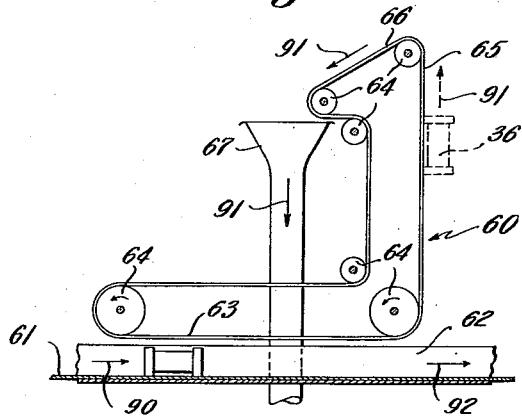

Figs. 8 and 9 illustrate an embodiment of this invention in which the path of travel of the charge carriers is controlled by a magnetic belt 60. The line of carriers is advanced by a belt 61 along a channel 62 below a length 63 of the magnetic belt 60 parallel to the belt 61. The belt 60 passes around a plurality of pulleys 64 and travels vertically along a length 65 and at an inclination along a length 66. The charge carriers 36 are removed from the line as they arrive below the length 63, raised vertically along the length 65 and lowered at an incline along the length 66 which leads to the mouth of a chute 67 through which the carriers pass on their way to the authorizers. The magnetic belt may be of any well known construction as for example a fabric belt provided with a plurality of transversely extending rods of soft iron provided with a permanent magnetic charge.

Figure 11:
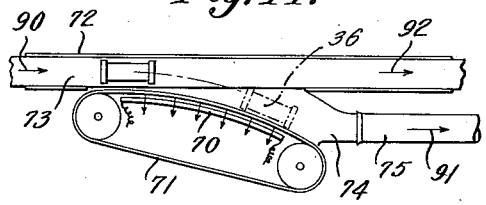
Figure 10:
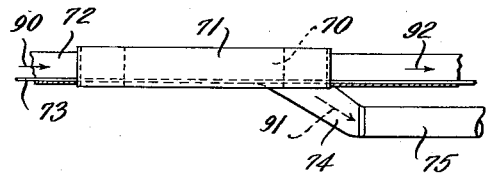

The embodiment of this invention shown in Figs. 10 and 11 differs from those previously described in that the separation of the charge carriers from the line is attained by means of a magnetic plate 70 in front of which travels an endless belt 71 of fabric or other material not influenced by magnetism. The carriers are advanced to the separating means along a channel 72 by a belt 73 and the charge carriers, separated from the line by the plate 70 and belt 71, are delivered to a chute 74 which conducts them to a tube 75 through which they are drawn pneumatically along their way to the authorizers.

Figure 13:
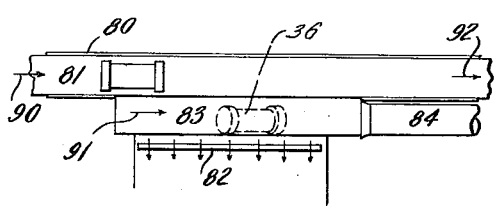
Figure 12:
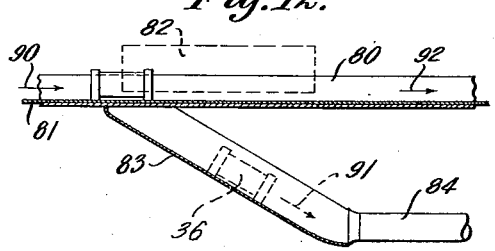
Figure 14:
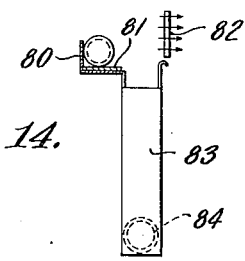

Figs. 12, 13 and 14 illustrate another application of the magnetic plate principle in an installation embodying this invention. The line of carriers is advanced along a channel 80 by a belt 81. Mounted at one side of the channel and spaced therefrom a distance greater than the diameter of the carrier heads is a magnetic plate 82. Between the channel 80 and the plate 82 is a chute 83 leading to a tube 84. The charge carriers pass along the channel 80 and upon their arrival in front of the magnetic plate 82 are drawn thereby off the belt 81 over the chute 83 into which they fall by the force of gravity which is sufficient to overcome the attraction of the plate.

In each of the various embodiments shown and described a line of heterogeneously arranged cash and charge carriers are advanced along a channel in the direction indicated by the arrow 90 to the magnetic separating means. The charge carriers being magnetic are removed by such means from the line and follow the direction indicated by the arrows 91 to an instrumentality which sends them on their path to the authorizers. The cash carriers, however, being non-magnetic do not respond to the magnetic means and continue in their line of travel, as indicated by the arrows 92, to the cashiers. Means not shown are of course provided in the various installations for actuating the moving parts thereof.

While certain embodiments of this invention have been shown and described it will be understood that the invention is not limited thereto and that other embodiments may be made without departing from the spirit and scope thereof as set forth in the following claims.

I claim:

1. In a pneumatic dispatch system, means for advancing a line of carriers some of which are magnetic, magnetic means to which the line of carriers is advanced and by which the magnetic carriers are removed from the line and means to which the removed carriers are transferred by said magnetic means.

2. In a pneumatic dispatch system, means for advancing a line of carriers some of which are magnetic, magnetic means to which the line of carriers is advanced and by which the magnetic carriers are removed from the line and means to which the removed carriers are transferred by said magnetic means and by which such carriers are forwarded to a predetermined destination.

3. In a pneumatic dispatch system, means for advancing a line of carriers some of which are magnetic, magnetic means for which the line of carriers is advanced and by which the magnetic carriers are removed from the line and means to which the removed carriers are transferred by said magnetic means and by which such carriers are forwarded to a predetermined destination, the other carriers in the line passing said magnetic means undisturbed on their way to a destination other than that of the removed carriers.

4. In a pneumatic dispatch system, means for advancing a line of carriers some of which are magnetic, magnetic means to which the line of carriers is advanced and by which the magnetic carriers are removed from the line at right angles thereto and means to which the removed carriers are transferred by said magnetic means for further travel to a predetermined destination.

5. In a pneumatic dispatch system, means for advancing a line of carriers some of which are magnetic, magnetic means to which the line of carriers is advanced and by which the magnetic carriers are removed from the line by raising them at right angles thereto and means to which the removed carriers are transferred by said magnetic means for further travel to a predetermined destination.

6. In a pneumatic dispatch system, means for advancing a line of carriers some of which are magnetic, magnetic means to which the line of carriers is advanced and by which the magnetic carriers are removed from the line laterally at right angles thereto and a chute to which the removed carriers are transferred by said magnetic means and by which these carriers are advanced toward a predetermined destination.

7. In a pneumatic dispatch system, means for advancing a line of carriers some of which are magnetic, a belt adjacent which said line of carriers is advanced, magnetic means associated with said belt for causing said magnetic carriers to travel with said belt, leaving the line of carriers, and means to which said magnetic carriers are transferred by said belt.

8. In a pneumatic dispatch system, means for advancing a line of carriers some of which are magnetic, a belt adjacent which said line of carriers is advanced, pulleys over which said belt passes, magnetic means associated with said belt for causing said magnetic carriers to travel with said belt around one of said pulleys, leaving the line of carriers, and means to which said magnetic carriers are transferred by said belt.

9. In a pneumatic dispatch system, means for advancing a line of carriers some of which are magnetic, a belt adjacent which said line of carriers is advanced, pulleys over which said belt passes, one of said pulleys being magnetic and acting upon the magnetic carriers to draw them with the belt around such pulley, leaving the line of carriers, and means to which said magnetic carriers are transferred by said belt.

10. In a pneumatic dispatch system, means for advancing a line of carriers some of which are magnetic, a belt adjacent which said line of carriers is advanced, pulleys over which said belt passes, a magnetic plate mounted between the pulleys and over which the belt passes, said plate causing said magnetic carriers to leave the line of carriers and travel with said belt and means to which said magnetic carriers are transferred by said belt.

11. In a pneumatic dispatch system, means for advancing a line of carriers, some of which are magnetic, a magnetic belt below which said line of carriers is advanced and by which said magnetic carriers are removed from the line and caused to travel with the belt, and means to which said magnetic carriers are transferred by said belt.

12. In a pneumatic dispatch system, means for advancing a line of carriers, some of which are magnetic, a magnetic pulley adjacent which said line of carriers is advanced and by which said magnetic carriers are removed from the line and caused to travel with the pulley and means to which said magnetic carriers are transferred by said pulley.

13. In a pneumatic dispatch system, means for advancing a line of carriers, some of which are magnetic, a magnetic pulley adjacent which said line of carriers is advanced and by which said magnetic carriers are removed from the line and caused to travel with the pulley and a tube to which said magnetic carriers are transferred by said pulley and through which the said magnetic carriers continue their travel.

14. In a pneumatic dispatch system, means for advancing a line of carriers, some of which are magnetic, a magnetic plate adjacent which said line of carriers is advanced and by which said magnetic carriers are removed from the line and means to which said magnetic carriers are transferred by said plate.

15. In a pneumatic dispatch system, means for advancing a line of carriers, some of which are magnetic, a magnetic plate adjacent which said line of carriers is advanced and by which said magnetic carriers are removed from the line and means to which said magnetic carriers are transported by said plate, said means consisting of a chute through which the said magnetic carriers continue their travel.

16. A carrier for a pneumatic dispatch system comprising a tubular body, heads at the ends of said body, said body and heads being of non-magnetic material and an element of magnetic material between the body and the head at one end of said carrier.

17. A carrier for a pneumatic dispatch system comprising a tubular body, heads at the ends of said body, said body and heads being of non-magnetic material and a cap of magnetic material between one end of the body and the head at such end.

18. A carrier for a pneumatic dispatch system comprising a tubular body, heads at the ends of said body, said body and heads being of non-magnetic material and a disk of magnetic material between one end of the body and the head at such end.

19. A carrier for a pneumatic dispatch system comprising a tubular body, heads at the ends of said body and an element of magnetic material between the body and the head at one end of said carrier.

20. A carrier for a pneumatic dispatch system comprising a tubular body, heads at the ends of said body and a disk of magnetic material between one end of the body and the head at such end.

FRANKLIN K. HAVEN.